United States Patent
Kim

(10) Patent No.: US 9,908,491 B2
(45) Date of Patent: Mar. 6, 2018

(54) ELECTRONIC APPARATUS AND CONTROL METHOD THEREOF

(71) Applicant: THINKWARE SYSTEMS CORPORATION, Seongnam-si, Gyeonggi-do (KR)

(72) Inventor: Hong Young Kim, Seongnam-si (KR)

(73) Assignee: THINKWARE SYSTEMS CORPORATION, Seongnam-si, Gyeonggi-Do (KR)

( * ) Notice: Subject to any disclaimer, the term of this patent is extended or adjusted under 35 U.S.C. 154(b) by 576 days.

(21) Appl. No.: 14/613,024

(22) Filed: Feb. 3, 2015

(65) Prior Publication Data
US 2015/0224947 A1     Aug. 13, 2015

(30) Foreign Application Priority Data

Feb. 7, 2014  (KR) ........................ 10-2014-0014010

(51) Int. Cl.
*B60R 16/033*    (2006.01)
*B60R 16/03*     (2006.01)

(52) U.S. Cl.
CPC ............ *B60R 16/033* (2013.01); *B60R 16/03* (2013.01)

(58) Field of Classification Search
CPC .................................................. B60R 16/033
See application file for complete search history.

(56) References Cited

U.S. PATENT DOCUMENTS

| | | | |
|---|---|---|---|
| 2,913,587 A | 11/1959 | Gebhard | |
| 6,066,899 A | 5/2000 | Rund et al. | |
| 2011/0082598 A1 | 4/2011 | Boretto et al. | |
| 2011/0163721 A1 | 7/2011 | Van Wiemeersch | |
| 2011/0246252 A1 | 10/2011 | Uesugi | |
| 2012/0133333 A1* | 5/2012 | Morioka | H01M 10/441 320/134 |
| 2012/0187915 A1 | 7/2012 | Brombach et al. | |
| 2013/0091083 A1* | 4/2013 | Frisch | G06N 99/005 706/14 |
| 2015/0345977 A1* | 12/2015 | Saito | B60L 3/00 701/521 |

FOREIGN PATENT DOCUMENTS

| | | |
|---|---|---|
| DE | 102006017921 A1 | 10/2007 |
| EP | 1495915 A1 | 1/2005 |
| JP | 2004-146075 A | 5/2004 |
| JP | 2005-318730 A | 11/2005 |
| JP | 2010-110188 A | 5/2010 |
| WO | 2013042619 A1 | 3/2013 |

\* cited by examiner

*Primary Examiner* — Jeffrey Shin
(74) *Attorney, Agent, or Firm* — Sang Ho Lee; Novick, Kim & Lee, PLLC

(57) ABSTRACT

A control method for an electronic apparatus according to an embodiment of the present invention includes acquiring current time zone information, discriminating a seasonal status in the vicinity of a vehicle on the basis of the acquired current time zone information, deciding a change or non-change of a minimum cutoff voltage for cutting off power received from a battery of the vehicle according to the discriminated seasonal status, and changing the cutoff voltage according to the change or non-change of the cutoff voltage.

20 Claims, 7 Drawing Sheets

TIME ZONE-BASED SEASON TABLE

| APRIL TO OCTOBER | SUMMER |
|---|---|
| NOVEMBER TO MARCH | WINTER |
| <TIME ZONE> | <SEASONAL STATUS> |

SEASON-BASED CUTOFF VOLTAGE TABLE

| SUMMER | 12.1V |
|---|---|
| WINTER | 11.6V |
| <SEASONAL STATUS> | <CUTOFF VOLTAGE> |

FIG. 5

ELECTRONIC APPARATUS AND CONTROL METHOD THEREOF

CROSS-REFERENCE TO RELATED APPLICATIONS

This application claims priority from Korean Patent Application No. 10-2014-0014010, filed on Feb. 7, 2014, in the Korean Intellectual Property Office, the disclosure of which is incorporated herein by reference in its entirety.

BACKGROUND OF THE INVENTION

Field of the Invention

The present disclosure relates to an electronic apparatus and a control method thereof, and more particularly, an electronic apparatus, capable of performing a low-voltage cutoff function, and a control method thereof.

Description of the Related Art

With the development of electronic technologies, various types of electronic apparatuses are under development and release. Specifically, various electronic apparatuses which are attached to a vehicle to provide information for a driver of the vehicle have recently been used. For example, a black box, a navigator, or the like are attached to the vehicle and connected to a vehicle battery. The vehicle black box or vehicle navigator then acquire image information and the like while the vehicle is driven or parked, and provide the acquired image information to the driver.

However, in general, a battery is a very important power supply device for the vehicle. Hence, if power (electricity) of the battery of the vehicle is consumed due to repetitive operations, a starting failure of the vehicle is caused.

Therefore, when the related art electronic apparatus for the vehicle is connected as a regular power supply to the vehicle battery for operating the electronic apparatus, the related art electronic apparatus employs a method of setting a battery cutoff voltage to forcibly cut off a low voltage in advance, even if an engine of the vehicle is switched off after the vehicle is parked.

However, even though such cutoff voltage is set by the method, the vehicle battery has a problem in that its function changes depending on seasons or temperature. For example, when the related art electronic apparatus for vehicle maintains a cutoff voltage value which has been set in summer, a voltage of the vehicle battery is lowered down to an extremely low voltage in winter. Accordingly, the batter runs out of power, thereby causing a starting failure of the vehicle.

Furthermore, when the battery completely discharges due to repetition of such frequent discharging as the season changes, the battery has to be replaced. This brings about great losses of time and costs. However, technologies provided so far merely allow for simply setting a cutoff voltage and also increase inconvenience in changing a voltage cutoff value. Therefore, such technologies fail to give fundamental solutions to fix the problems.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention has been invented according to the aforementioned necessity. Therefore, an aspect of the present invention is to provide an electronic apparatus, which is capable of preventing discharge of a vehicle battery by actively changing a voltage-cutoff set value on the season basis, and improving user convenience, and a control method thereof.

In order to achieve the above object and other advantages, there is provided a control method for an electronic apparatus disposed in a vehicle, the method including acquiring current time zone information, discriminating a seasonal status in the vicinity of the vehicle based on the acquired current time zone information, deciding whether or not to change a minimum cutoff voltage for cutting off power received from a battery of the vehicle according to the discriminated seasonal status, and changing the cutoff voltage according to the decision of the change or non-change of the cutoff voltage.

In accordance with an embodiment of the present invention to overcome those drawbacks and other disadvantages, there is provided an electronic apparatus disposed in a vehicle, the electronic apparatus including a time information module configured to acquire current time zone information, a season discrimination module configured to discriminate a seasonal status in the vicinity of the vehicle based on the acquired current time zone information, a controller configured to decide whether or not to change a minimum cutoff voltage for cutting off power received from a battery of the vehicle according to the discriminated seasonal status, and a power supply unit configured to change the cutoff voltage according to the change or non-change of the cutoff voltage.

In accordance with an embodiment disclosed herein, a season in the vicinity of a vehicle and an appropriate cutoff voltage may be discriminated based on time information and a cutoff voltage set value may actively change, so as to prevent discharge of a battery of the vehicle and improve user convenience.

Also, in accordance with an embodiment disclosed herein, a season of a place where a vehicle is located and an appropriate cutoff voltage can be discriminated based on position (or location) information or region setting information, and a cutoff voltage set value can actively change. Therefore, the discharge of a battery can be prevented even though the seasonal variation according to a region where the vehicle is located is caused, and user convenience can be improved.

Meanwhile, in accordance with an embodiment disclosed herein, as another electronic apparatus transmits a cutoff voltage value according the season discriminated based on time information, a cutoff voltage can actively change even without a separate module provided in an electronic apparatus itself. This may result in improvement of user convenience and reduction of fabricating costs of the electronic apparatus.

BRIEF DESCRIPTION OF THE DRAWING FIGURES

The above and/or other aspects of the present invention will be more apparent by describing certain exemplary embodiments of the present invention with reference to the accompanying drawings, in which:

FIG. 5 is a view illustrating a time-based cutoff voltage table referred to by an electronic device in accordance with one embodiment disclosed herein;

DETAILED DESCRIPTION OF THE EXEMPLARY EMBODIMENTS

Figure 1:
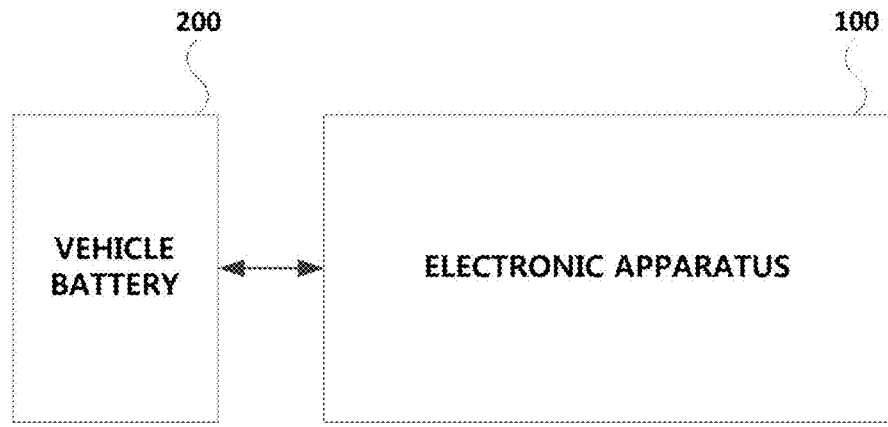
FIG. 1 is a schematic view of a system including an electronic apparatus in accordance with one embodiment disclosed herein.

The following description only illustrates the principles of the present invention. Therefore, those skilled in the art can derive various devices that implement the principles of the present invention and are included in the concept and scope of the present invention even if the devices are not explicitly described or illustrated herein. It should be understood that the conditional terms and embodiments of the present disclosure are provided so that the concept of the present invention can be understood and it should be understood that the present invention is not limited to the specified embodiments and states.

Further, it should be understood that not only the principles, aspects, and embodiments of the present invention but also all detailed descriptions of specific embodiments include structural and functional equivalents thereof. Further, it should be understood that these equivalents include not only published equivalents but also equivalents that will be developed, i.e. all devices designed to perform the same functions regardless of structures.

Therefore, for instance, it should be understood that the block diagrams of the present disclosure illustrate conceptual aspects of exemplary circuits that realize the principles of the present invention. Similarly, it should be understood that all flowcharts, state transition diagrams, and pseudo codes represent various processes that are performed by a computer or processor regardless of whether the flowcharts, state transition diagrams, and pseudo codes can be substantially indicated in a computer-readable medium or the computer or processor is explicitly illustrated.

Functions of devices illustrated in the drawings including function blocks represented as a processor or similar concept can be provided by dedicated hardware as well as hardware capable of executing pertinent software. When the functions are provided by a processor, the functions may be provided by a single dedicated processor, a single shared processor, or multiple individual processors, and a part thereof may be shared.

Further, the terms suggested as a processor, control, or similar concept thereof should not be interpreted by exclusively referring to hardware capable of executing software, but should be interpreted to include digital signal processor (DSP) hardware and ROM, RAM, and non-volatile memory for storing software. Other well-known hardware may be included.

In the claims, the elements expressed as means for performing the functions described in the detailed description include a combination of circuits for performing the functions or all methods for performing functions including all types of software including firmware/micro code. The elements are connected to appropriate circuits to execute the functions, thereby performing the functions. Since the present invention defined by the claims combines functions provide by listed means in a manner required by the claims, it should be understood that any means capable of providing the functions are equivalent to those of the present disclosure.

The above-described purpose, feature, and advantage will be clarified by the following detailed descriptions which are related to the accompanying drawings. Accordingly, the technical spirit of the present invention can be easily embodied by those skilled in the art to which the present invention pertains. Furthermore, when it is determined that a specific description for a well-known technology related to the present invention may unnecessarily make the purport of the present invention ambiguous in the detailed descriptions of the present invention, the specific description will be omitted.

Hereafter, exemplary embodiments of the present invention will be described in detail with reference to the accompanying drawings.

FIG. 1 is a schematic view of a system including an electronic apparatus in accordance with one embodiment disclosed herein.

An electronic apparatus (or an electronic device) 100 to be explained herein can be implemented into various types of apparatuses connected to a vehicle battery 200. For example, the electronic apparatus 100 may be implemented into various apparatuses, such as a navigator which navigates up to a predetermined point, a black box which captures surroundings of a vehicle and stores and transmits the captured image information, a smart phone, a tablet computer, a notebook computer, a personal digital assistant (PDA), a portable multimedia player (PMP), and the like.

The electronic apparatus 100 may be driven by power received from the vehicle battery 200. Specifically, when ignition of the vehicle having the electronic apparatus 100 is turned off while the vehicle is parked, the electronic apparatus 100 may operate using a regular power supply of the vehicle battery 200, if necessary.

Here, the electronic apparatus 100 may set a cutoff voltage to prevent a problem of a starting failure of the vehicle by considering an output of the vehicle battery 100. According to an embodiment of the present invention, the electronic apparatus 100 may change the cutoff voltage to an appropriate value to be suitable for a season, such as winter, for which performance degradation of the vehicle battery occurs.

To this end, the electronic apparatus 100 may acquire current time zone information, and discriminate a seasonal status in the vicinity of the vehicle based on the acquired current time zone information. The electronic apparatus 100 may then decide whether or not to change a minimum cutoff voltage for cutting off power received from the battery of the vehicle according to the discriminated seasonal status, and change the cutoff voltage according to the change or non-change of the cutoff voltage.

Here, the current time zone information may be acquired based on time information obtained from a Real Time Clock (RTC) module. Also, the electronic apparatus 100 may update the time information of the RTC module according to time zone information which has been updated in response to an environment setup.

The update of the time information may be carried out in a manner that an environment setup for the electronic apparatus 100 and time zone information update are performed according to data, which results from that the second electronic apparatus executes the environment setup for the electronic apparatus 100. The time information of the RTC module may be synchronized with time information of the second electronic apparatus.

The current time zone information may also be acquired on the basis of time information acquired from a global positioning system (GPS) module. Accordingly, the electronic apparatus 100 may discriminate the seasonal status based on position information acquired from the GPS module and the current time zone information.

Here, the electronic apparatus 100 may acquire region information where the vehicle is located on the basis of the position information acquired from the GPS module. The seasonal status can be identified on the basis of the acquired region information and the current time zone information.

Also, the electronic apparatus 100 may acquire the region information on the basis of an environment set value thereof or the position information obtained from the GPS module, and acquire a cutoff voltage value, which corresponds to the acquired region information or the seasonal status, based on a region-based cutoff voltage value table. The acquired cutoff voltage value may decide the change or non-change of the cutoff voltage.

Meanwhile, the cutoff voltage value according to the seasonal status may be set according to an environment setup of a second electronic apparatus which is connectable to the electronic apparatus 100.

When being provided with both of the GPS module and the RTC module, the electronic apparatus 100 may acquire the current time zone information from a predetermined module.

Also, some of such operations of the electronic apparatus 100 may be executed by another electronic apparatus. Here, the another electronic apparatus, for example, may include a computer or a mobile terminal, such as a smart phone.

Here, the another electronic apparatus may be connected to the electronic apparatus 100 through a network. The another electronic apparatus may acquire current time zone information of the electronic apparatus 100, discriminate the seasonal status in the vicinity of the vehicle based on the acquired current time zone information, decide a minimum cutoff voltage value for cutting off power supplied from the vehicle battery to the electronic apparatus 100 according to the discriminated seasonal status, and transmit the minimum cutoff voltage value to the electronic apparatus 100. The other operations, except for the transmission, of the another electronic apparatus are the same as those of the electronic apparatus 100 to be explained later. Therefore, detailed description thereof will be replaced with the description of the electronic apparatus 100.

The electronic apparatus 100 according to the one embodiment disclosed herein, which performs such operations, may be implemented as a navigator for vehicle or a black box for vehicle, for example.

When the electronic apparatus 100 is the vehicle navigator, the electronic apparatus 100 may refer to a system, which notifies various data associated with operations, a maintenance and the like of the vehicle to a driver and passengers of the vehicle. In this instance, the electronic apparatus 100 may be the very vehicle navigator in a limited sense, but, in a broad sense, can be understood as a conception including various types of electronic devices which are interoperable with the electronic apparatus 100 in a wired or wireless manner.

This may mean that the electronic apparatus 100 can construct an integrated system by connecting various types of electronic devices, which can assist and increase functions of the vehicle navigator. The electronic devices which may construct the system may be other mobile terminals, remote controllers and the like, which can access mobile communication networks.

When the electronic apparatus 100 is implemented as the vehicle black box, the electronic apparatus 100 may be implemented separately or integrally with a navigator.

When the electronic apparatus 100 is implemented as the black box for vehicle, the electronic apparatus 100 may exchange signals with a vehicle navigator or a mobile terminal, to store data required for a process of handling a vehicle accident. For example, when an accident happens during driving of the vehicle, image data stored in the electronic apparatus 100 may be analyzed and the analyzed data can be used to determine the cause of the accident and an accidental degree. Also, when the electronic apparatus 100 is connected to a vehicle navigator or another mobile terminal, the electronic apparatus 100 may utilize various data stored in the vehicle navigator or the another mobile terminal. For example, an image acquired by the electronic apparatus 100 may match map data stored in the another mobile terminal, so as to increase efficiency of the electronic apparatus 100.

When the electronic apparatus 100 is implemented as the black box for vehicle, the electronic apparatus 100 may acquire vehicle-related data while the vehicle is driven and stopped. That is, the electronic apparatus 100 can capture images while the vehicle is running and also even while the vehicle is stopped. The images acquired by the electronic apparatus 100 may have qualities which are constant or changeable. For example, images captured before and after an accident happens may have high image qualities and images which are normally captured have low image qualities, thereby minimizing a required storage space and storing crucial images.

An entire system network including the electronic apparatus 100 according to the one embodiment disclosed herein may perform communication through Bluetooth, radio frequency identification (RFID), infrared data association (IrDA), ultra wideband (UWB), ZigBee and the like.

Hereinafter, the configuration and the operations of the electronic apparatus 100 will be described in more detail.

Figure 2:
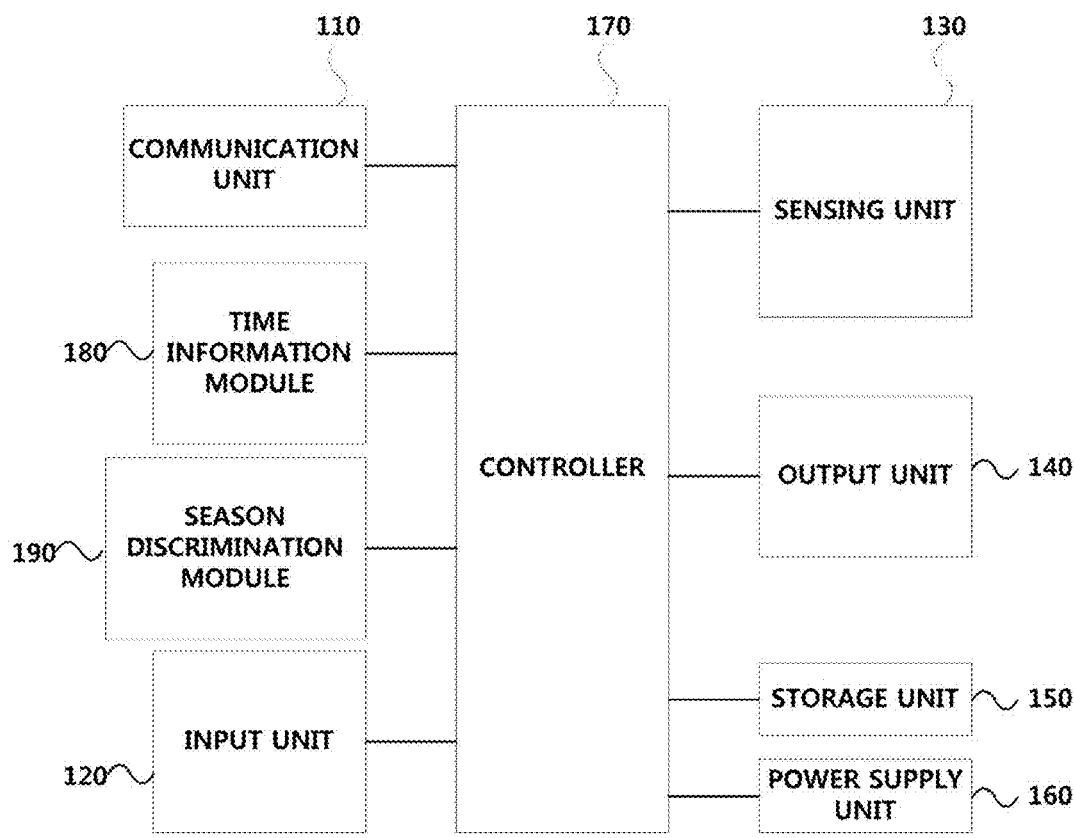
FIG. 2 is a block diagram illustrating an electronic device in more detail in accordance with one embodiment disclosed herein.

FIG. 2 is a block diagram illustrating the electronic device 100 in more detail in accordance with the one embodiment disclosed herein.

As illustrated in FIG. 2, the electronic apparatus 100 according to the one embodiment disclosed herein may include a communication unit 110, an input unit 120, a sensing unit 130, an output unit 140, a storage unit 150, a power supply unit 160, a controller 170, a time information module 180, and a season discrimination module 190.

The communication unit 110 may be configured to communicate with other devices. The communication unit 110 may include all or part of a location data module, a wireless Internet module, a broadcast transmission/reception module, a short-range communication module, and a wired communication module.

The location data module is a module which acquires location data through a global navigation satellite system (GNSS). The GNSS refers to a navigation system which calculates a location of a receiving terminal using an electric wave signal received from a satellite. Examples of the GNSS may include, according to an operating entity, global positioning system (GPS), Galileo, global orbiting navigational satellite system (GLONASS), COMPASS, Indian regional navigational satellite system (IRNSS), quasi-zenith satellite system (QZSS), and the like. The location data module of the electronic apparatus 100 according to the one embodiment may acquire location data by receiving a GNSS signal which is serviced in a region where the electronic apparatus 100 is used.

The wireless Internet module is a module which acquires or transmits data by accessing a wireless Internet. Examples of the wireless Internet which is accessible through the wireless Internet module may include wireless LAN (WLAN), wireless broadband (Wibro), world interoperability for microwave access (Wimax), high speed downlink packet access (HSDPA), and the like.

The broadcast transmission/reception module is a module which transmits and receives broadcast signals through various broadcast systems. Examples of the broadcast system which can perform transmission and reception through the broadcast transmission/reception module may include digital multimedia broadcasting terrestrial (DMBT), digital multimedia broadcasting satellite (DMBS), media forward link only (MediaFLO), digital video broadcast handheld (DVBH), integrated services digital broadcast terrestrial (ISDBT), and the like. The broadcast signals transmitted and received through the broadcast transmission/reception module may include traffic data, daily life data and the like.

The short-range communication module is a module for short-range or near field communication. The short-range communication module, as aforementioned, may perform communication through Bluetooth, radio frequency identification (RFID), infrared data association (IrDA), ultra wideband (UWB), ZigBee and the like.

The wired communication module is an interface device through which the electronic apparatus 100 is connectable to another device in a wired manner. The wired communication module may be a USB module which can perform communication through a USB port.

The electronic apparatus 100 according to the one embodiment and other embodiments may communicate with other devices through the short-range communication module or the wired communication module. In addition, when communicating with a plurality of devices, the electronic apparatus may communicate with one device through the short-range communication module, and another one through the wired communication module. Accordingly, in case of an electronic apparatus which does not include a camera function according to one embodiment, the electronic apparatus may receive images captured by a black box through the communication unit 110, or receive images captured by a separate camera which is installed to face the front of a vehicle.

The input unit 120 is a device which converts a physical input applied from the exterior of the electronic apparatus 100 into a specific electric signal. The input unit 120 may include all or part of a user input module and a microphone module.

The user input module is a module which allows a user to apply a touch input, a push input or the like. Here, the user input module may be implemented by using at least one of various types of buttons, a touch sensor receiving a touch input and a proximity sensor receiving a proximate motion.

The microphone module is a module which receives user's voice and internal and external sounds of the vehicle.

The sensing unit 130 is a device which can sense a current state of the electronic apparatus 100. The sensing unit 130 may include all or part of a motion sensing module and an optical sensing module.

The motion sensing module may sense a motion of the electronic apparatus 100 on a three-dimensional (3D) space. The motion sensing module may include a triaxial geomagnetic sensor and a triaxial acceleration sensor. Motion data acquired through the motion sensing module and location data acquired through the location data module may be combined with each other so as to calculate a more accurate track of the vehicle with the electronic apparatus 100 attached thereto.

The optical sensing module is a module which measures ambient illustration of the electronic apparatus 100. By using illumination data acquired through the optical sensing module, brightness of a display module included in the output unit 140 can change to correspond to ambient brightness.

The output unit 140 is a device which outputs data of the electronic apparatus 100. The output unit 140 may include all or part of a display module and an audio output module.

The display module is a module which outputs data visually recognized by the electronic apparatus 100. The display module may be implemented as a display unit disposed on a front surface of a housing of the electronic apparatus 100. Here, the display module may be formed integrally with the electronic apparatus 100 to output visually-recognizable data, or installed, like a head up display (HUD), separate from the electronic apparatus 100, so as to output the visually-recognizable data.

The audio output module is a module which outputs data audibly recognized by the electronic apparatus 100. The audio output module may be implemented as a speaker, which outputs data necessary to be notified to a user of the electronic apparatus 100 in the form of sound.

The storage unit 150 is a device which stores data required for the operation of the electronic apparatus 100 and data generated by the operation. The storage unit 150 may be an embedded memory of the electronic apparatus 100 or a detachable memory. The data required for the operation of the electronic apparatus 100 may include an OS, a region information table, a time zone-based cutoff voltage table, a region-based cutoff voltage table, a route search application, a map and the like. Also, the data generated by the operation of the electronic apparatus 100 may include captured image data, environment setup data and the like.

The power supply unit 160 is a device which supplies power required for the operation of the electronic apparatus 100 or an operation of another device connected to the electronic apparatus 100. The power source unit 160 may be a device which receives power from an embedded battery of the electronic apparatus 100 or an external power source, such as a vehicle. Also, the power supply unit 160 may be implemented as a wired communication module or a wireless communication module according to a method of receiving power supplied.

Specifically, when the vehicle receives power from the vehicle battery 200 in a parking mode, the power supply unit 160 may measure an output voltage of the vehicle battery 200. When the output voltage of the vehicle battery 200 is lower than a cutoff voltage value, the power supply unit 160 may perform a voltage cutoff. When the voltage cutoff is carried out, the power supply unit 160 may stop a power supply to the electronic apparatus 100. To this end, the power supply unit 160 may be provided with an auxiliary power source. Also, the power supply unit 160 may perform a cutoff voltage change according to the control of the controller 170.

The controller 170 is a device which outputs a control signal for controlling various operations of the electronic apparatus 100. In addition, the controller 170 may output a control signal for controlling another apparatus connected to the electronic apparatus 100.

The time information module 180 is a module which acquires current time zone information and transfers the acquired current time zone information to the controller 170.

The time information module 180, for example, may acquire the current time zone information on the basis of time information which is acquired from a Real Time Clock (RTC) module. The RTC module may be driven by a power source, which is independent of the vehicle battery 200, and have an available period of about 9 to 17 years only by its own power. The time information module 180 may transfer time zone information acquired from the RTC module to the season discrimination module 190 according to the control of the controller 170. Also, the time information module 180 may update the time information of the RTC module according to time zone information which has been updated by an environment setup of the electronic apparatus 100.

Meanwhile, the time information module 180, for example, may acquire the current time zone information on the basis of time information acquired from a GPS module.

To this end, the time information module 180 may acquire the current time zone information by analyzing a GPS protocol, which comes from the GPS module of the communication unit 110 into Com port through serial communication. The GPS module may also receive time information, as well as latitude and longitude, from a satellite and output such information.

Also, the current time zone information acquired by the GPS module is represented in Greenwich Mean Time (GMT). Hence, the current time zone information may be changeable according to country setting. For example, information acquired from the GPS protocol may be represented in a manner of $GPRMC,134807.000,A,3732.6627,N, 12701.3549,E,1.58,329.68,110808,,,A*63. In this instance, in addition to the latitude and the longitude, time zone information may include date information of 110808 and time information of 134807.000.

The time information module 180 may thus discriminate the time of 13:48:07.00 (hh:mm:ss.sss) and the date of Aug. 8, 2011 from the time information acquired from the GPS module. When the country has been set to Korea in the environment setup, the number 9 may be added (+9) to time (hour) information, so as to acquire more accurate current time zone information.

Also, detailed time information may be unnecessary in discriminating a season. Therefore, the time information module 180 may acquire time zone information by extracting only date information from GPS information.

When the electronic apparatus 100 is provided with both of the GPS module and the RTC module, the time information module 180 may acquire the current time zone information from a predetermined module according to the environment setup.

The season discrimination module 190 may discriminate a seasonal status in the vicinity of the vehicle based on the current time zone information acquired by the time information module 180.

To this end, the season discrimination module 190 may compare a time zone-based season table, which is stored in the storage unit 150, with the time zone information. The time zone-based season table may be stored in the storage unit 150 along with cutoff voltage values.

The season discrimination module 190 may discriminate the seasonal status on the basis of the position information acquired from the GPS module and the current time zone information. Here, the season discrimination module 190 may discriminate a region/country from the position information, and discriminate the seasonal status by comparing a region-based season table stored in the storage unit 150 with the time zone information.

The controller 170 may decide change or non-change of a cutoff voltage for cutting off power supplied from the battery 200 of the vehicle according to the discriminated seasonal status.

For example, the controller 170 may check the cutoff voltage by comparing a season-based cutoff voltage table stored in the storage unit 150 with the discriminated seasonal status, and decide the change or non-change of the cutoff voltage by comparing the checked cutoff voltage with a cutoff voltage which has been set in the power supply unit 160.

Here, the controller 170 may decide the change or non-change of the cutoff voltage in a manner of acquiring information on a region at which the vehicle is located on the basis of the position information acquired from the GPS module, checking a cutoff voltage value corresponding to the acquired region information based on the season-based voltage value table corresponding to the region information, and then comparing the checked cutoff voltage value with a cutoff voltage set in the power supply unit 160.

The controller 170 may also decide the change or non-change of the cutoff voltage in a manner of checking a cutoff voltage value according to the seasonal status on the basis of environment setup information set in a second electronic apparatus and comparing the checked cutoff voltage value with the cutoff voltage set in the power supply unit 160.

Figure 3:
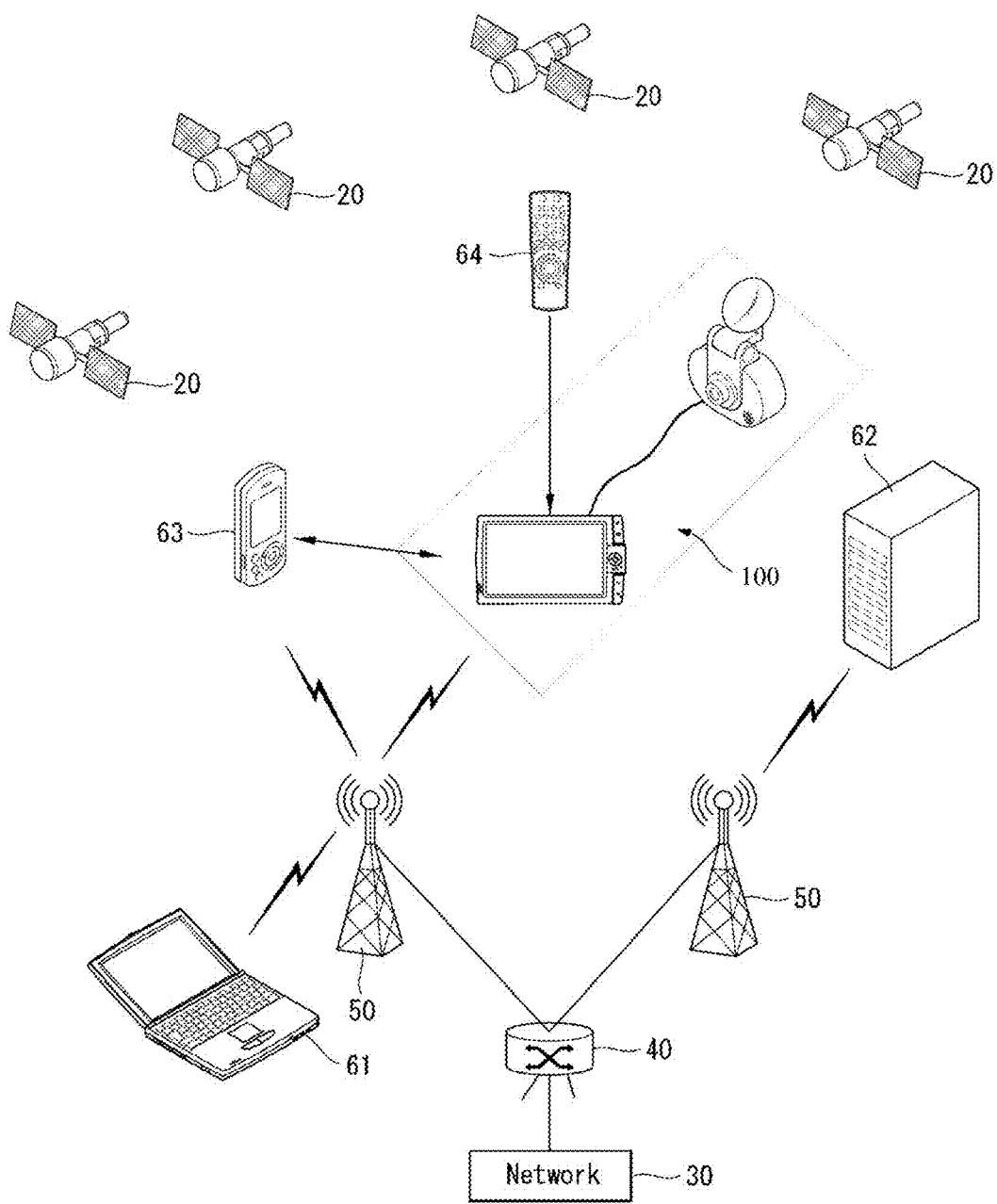
FIG. 3 is a view illustrating a network connected with an electronic apparatus in accordance with one embodiment disclosed herein.

FIG. 3 is a view illustrating a network connected with an electronic apparatus in accordance with one embodiment disclosed herein.

As illustrated in FIG. 3, the electronic apparatus 100 according to the one embodiment disclosed herein may be implemented as a navigator or a black box, and be connectable to various communication networks and other electronic apparatuses 61 to 64.

The electronic apparatus 100 may cooperate with the GPS module according to electric wave signals received from satellites 20, to calculate a current position and a current time zone.

Each satellite 20 may transmit an L-band frequency with a different frequency band. The electronic apparatus 100 may calculate the current position based on a time which is taken for the L-band frequency sent from each satellite 20 to reach the electronic apparatus 100.

Meanwhile, the electronic apparatus 100 may wirelessly access a network 30 through the communication unit 110 via a control station (ACR) 40, a base station (RAS) 50 and the like. When the electronic apparatus 100 accesses the network 30, the electronic apparatus 100 may be accessible indirectly to other electronic apparatuses 61 and 62, which have accessed the network 30, so as to exchange data with the other electronic apparatuses 61 and 62.

The electronic apparatus 100 may also access the network 30 indirectly through another apparatus 63 which has a communication function. For example, when the electronic apparatus 100 is not provided with a module for accessing the network 30, the electronic device 100 can perform communication with the other apparatus 63 having the communication function by use of the short-range communication module and the like.

Figure 4:
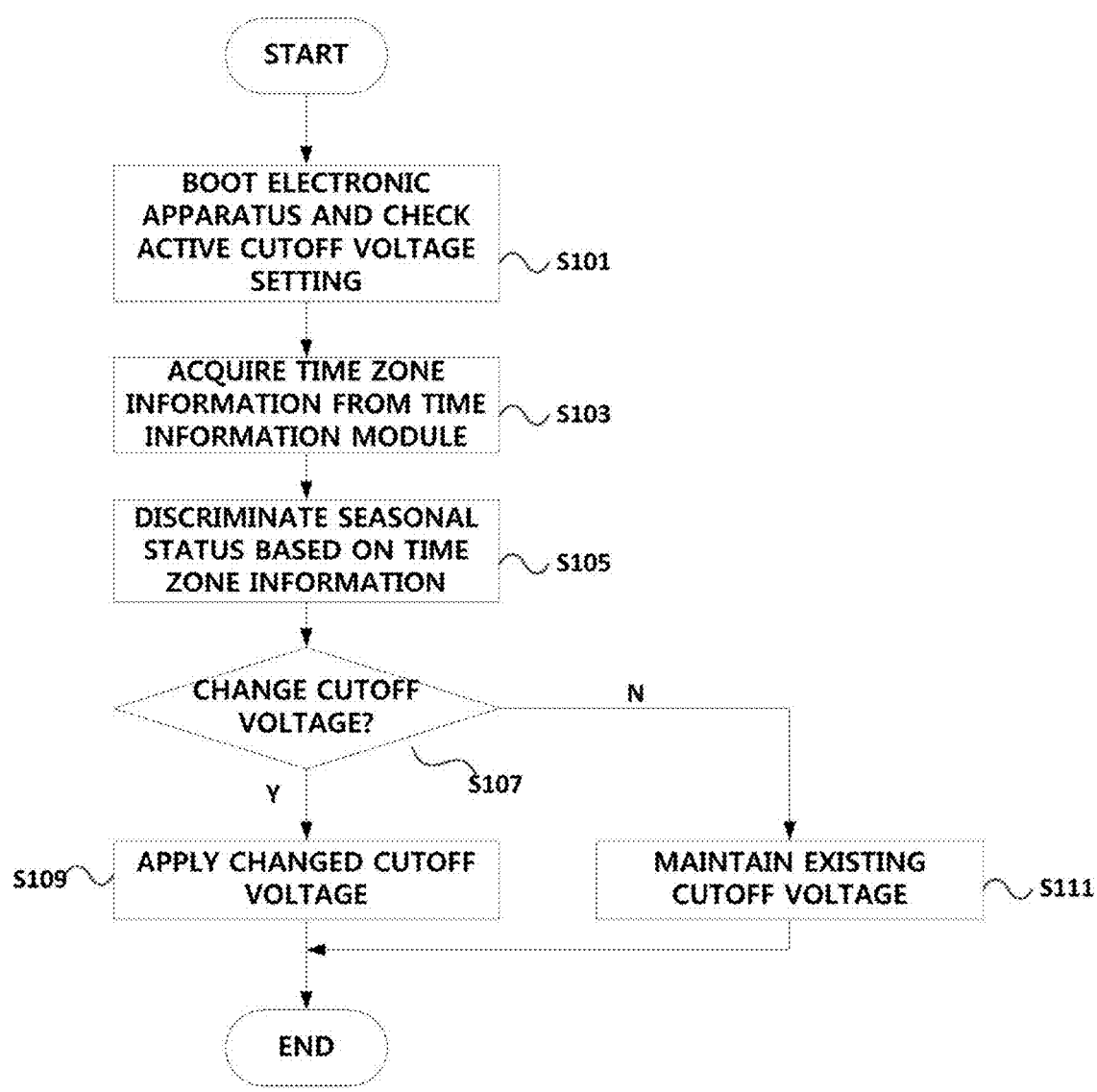
FIG. 4 is a flowchart illustrating a control method for an electronic apparatus in accordance with one embodiment disclosed herein.

FIG. 4 is a flowchart illustrating a control method for an electronic apparatus in accordance with one embodiment disclosed herein, and FIG. 5 is a view illustrating a time-based season table and a time-based cutoff voltage table referred to by an electronic device in accordance with one embodiment disclosed herein.

Hereinafter, description will be given of a control method for an electronic apparatus in accordance with one embodiment with reference to FIGS. 4 and 5.

First, the electronic apparatus 100 is booted and an active cutoff voltage setting is checked (S101).

The controller 170 may activate the power supply unit 160 to receive power therefrom, and perform the booting of the electronic apparatus 100. Here, when the power supply unit 160 is booted in a turn-off state of the ignition of the vehicle, the controller 170 may check a voltage of power received from the vehicle battery 200. When the checked voltage is lower than a cutoff voltage, the power supply toward the electronic apparatus 100 may be stopped. Accordingly, the booting may be stopped as well.

Afterwards, when the booting is done and the active cutoff voltage setting is checked, the electronic apparatus 100 acquires time zone information from the time information module 180 (S103).

As aforementioned, the time information module 180 may acquire the current time zone information based on at least one of the RTC information or the GPS information.

The current time zone information of the RTC module may be updated by an environment setup of the electronic apparatus 100. Also, time information of the RTC module may be updated according to time zone information which has been set in another apparatus, namely, a second electronic apparatus. Accordingly, the time information of the second electronic apparatus and the time information of the RTC module may be synchronized with each other.

For example, the second electronic apparatus may be a computer. The computer may include a second RTC module which is activated by a separate power source located on a main board. Therefore, when an environment setup for the electronic apparatus 100 is carried out through the computer, the time information with respect to the RTC module of the electronic apparatus 100 may be synchronized with the second RTC module of the computer.

Or, the second electronic apparatus may be a mobile terminal such as a smart phone. In this instance, the mobile terminal may include a GPS module or RTC module for time setup. Therefore, when the environment setup for the electronic apparatus 100 is carried out through the mobile terminal, the time information with respect to the RTC module of the electronic apparatus 100 may be synchronized with a time setup of the mobile terminal.

Meanwhile, as aforementioned, the time information module 180 may acquire the current time zone information by analyzing a GPS protocol, which comes from the GPS module of the communication unit 110 into Com port through serial communication. The acquired time information may have various formats. For data processing efficiency, the acquired time information may have a format of date (MM/DD) information or month information, except for a detailed time.

Specifically, as illustrated in FIG. 5, the time zone information may have a format including information related to N sections (divisions or parts), which are configured by dividing one year into the N sections.

The time information module 180 may compare the time information acquired from the RTC or GPS module with the N sections, and acquire a section corresponding to a current time as current time zone information. FIG. 5 exemplarily illustrates that one year is divided into two sections, and a section from April to October and a section from November to March are designated as time zone information. That is, the time zone information may also inform of to which section the time zone belongs, as well as a specific time or date.

Meanwhile, as aforementioned, the GPS module may also acquire latitude and longitude. Therefore, the time information module 180 may acquire more accurate time zone information by discriminating a current region or country according to latitude and longitude.

And, when the electronic apparatus is provided with both of the GPS module and the RTC module, the time information module 180 may acquire the current time zone information from a predetermined module according to an environment setup.

Afterwards, the electronic apparatus 100 discriminates a seasonal status on the basis of the acquired time zone information (S105).

As aforementioned, the season discrimination module 190 may discriminate the seasonal status in the vicinity of the vehicle based on the current time zone information acquired by the time information module 180.

The season discrimination module 190 may compare a time zone-based season table stored in the storage unit 150 with the time zone information. The time zone-based season table may be stored in the storage unit 150 along with a season-based cutoff voltage table.

Referring to FIG. 5, the time zone-based season table may include a time zone column and a seasonal status column. The time zone column may indicate section information acquired from the time information module 180. For example, the time zone column may include a first section of April to October, and a second section of November to March. The seasonal status may include a summer season (or summer) corresponding to the first section or a winter season (or winter) corresponding to the second section.

Therefore, the season discrimination module 190 may discriminate a current seasonal status based on the section information acquired from the time information module 180. Various table information may change according to an environment setup, which will be explained later.

Also, the time zone-based season table may need to be applied differently according to a region and a country at which the vehicle is currently located. This is because the section-based season is different and the state of the vehicle battery 200 changes according to each region and each country.

To this end, the season discrimination module 190 may discriminate the seasonal status in a manner of discriminating a region/country based on the position information acquired from the GPS module, and acquiring a time zone-based season table corresponding to the discriminated region/country.

Meanwhile, the electronic apparatus 100 decides a change or non-change of a cutoff voltage for cutting off power supplied from the battery of the vehicle according to the discriminated seasonal status (S107).

The controller 170 may check a cutoff voltage by comparing a season-based cutoff voltage table stored in the storage unit 150 with the discriminated seasonal status, and decide the change or non-change of the cutoff voltage by comparing the checked cutoff voltage with a cutoff voltage which is currently set with respect to the power supply unit 160.

When the cutoff voltage on the table is different from the existing cutoff voltage by more than a predetermine value, the controller 170 may decide the change of the cutoff voltage into the cutoff voltage on the table.

On the other hand, when the cutoff voltage on the table is not different from the existing cutoff voltage by more than a predetermine value, the controller 170 may decide a maintenance of the existing cutoff voltage.

Referring to FIG. 5, the season-based cutoff voltage table may include a seasonal status column and a cutoff voltage column. The seasonal status column may indicate the seasonal status which has been discriminated by the season discrimination module 180. For example, the seasonal status column may include a first seasonal status of summer and the second seasonal status of winter. The cutoff voltage may include 12.1 V (bolt) corresponding to the first seasonal status and 11.6 V corresponding to the second seasonal status.

Here, each season-based cutoff voltage may be set to an appropriate value according to a weather-based performance variation of the vehicle battery 200. Also, the season-based cutoff voltage may be different depending on a region/country where the vehicle is driven.

Therefore, the controller 170 may also decide the change or non-change of the cutoff voltage, in a manner of acquiring information related to a region where the vehicle is located based on the position information acquired from the GPS module, checking a cutoff voltage value corresponding to the acquired region information based on the season-based cutoff voltage table corresponding to the region information, and comparing the checked cutoff voltage value with a cutoff voltage preset in the power supply unit 160.

Afterwards, when the cutoff voltage is decided to change, the electronic apparatus 100 applies the changed cutoff voltage (S109). When the cutoff voltage is decided not to change, the electronic apparatus 100 may maintain the existing cutoff voltage (S111).

The controller 170 may apply the changed cutoff voltage by applying hardware change or software data setting change in a manner of controlling the power supply unit 160.

When the cutoff voltage changes, the power supply unit 160 may monitor a voltage of power received from the vehicle battery 200, and then cut the power supply off when the monitored voltage is lowered below the changed cutoff voltage.

Figure 6:
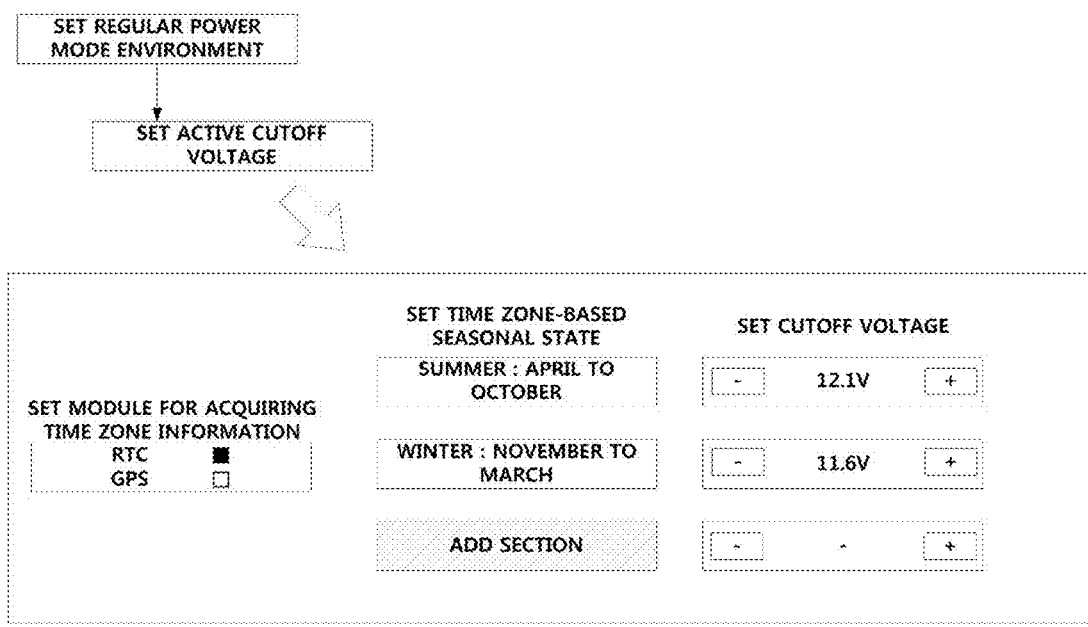
FIG. 6 is a view illustrating an active cutoff setting method according to an environment setup of an electronic apparatus in accordance with one embodiment disclosed herein.

FIG. 6 is a view illustrating an active block setting method according to an environment setup of an electronic apparatus in accordance with one embodiment disclosed herein.

As illustrated in FIG. 6, an active cutoff voltage setting and a generation of various table information of the electronic apparatus 100 according to the one embodiment disclosed herein may be enabled through an environment setup interface.

The environment setup interface may be provided by control of the input unit 120 and the output unit 140 of the electronic apparatus 100. Also, the environment setup interface may be provided by another apparatus, and environment setup information which has been generated in the another apparatus may be transmitted to the electronic apparatus 100 through the short-range communication module or the wired communication module. Also, the environment setup interface may be stored in a storage medium by the another apparatus, and environment setup information stored in the storage medium may also be loaded in the electronic apparatus 100.

The environment setup interface may include user selectable menus which are supportable in the electronic apparatus 100, and also include sub menu items, such as default setting, event setting, acceleration sensor sensibility setting, self-diagnosis, image setting, file backup assistance, setting initialization, storage device format, and the like.

Figure 8:
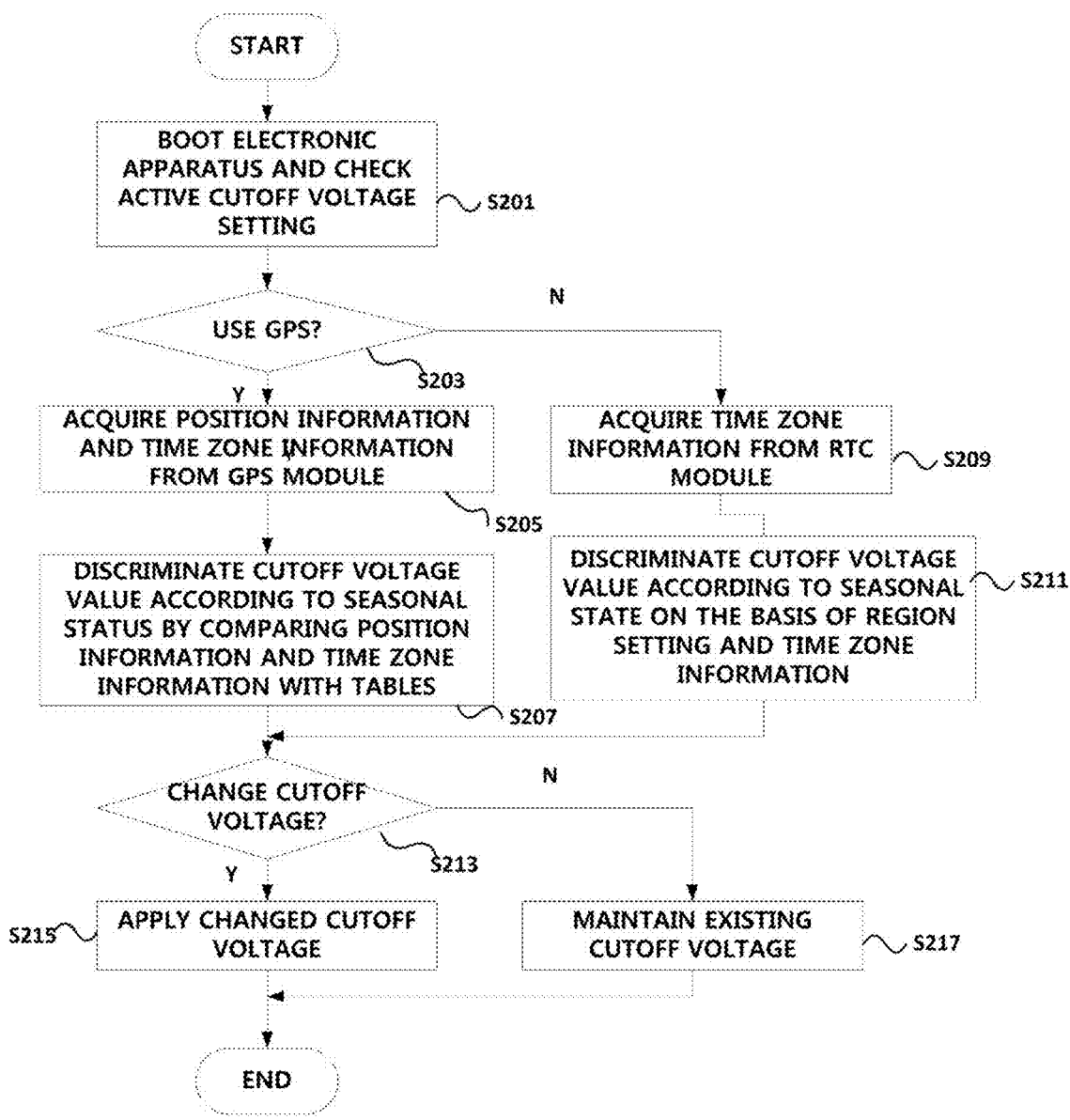
FIG. 8 is a view illustrating a control method for an electronic apparatus in accordance with another embodiment disclosed herein.

For example, when the default setting is selected among the sub menu items, menu items for selecting one of normal image quality, medium image quality and high image quality may be displayed and menu items for selecting a use or non-use of automatic image file deletion, variable frame, sound recording and the like may also be displayed. When the image setting is selected among the sub menu items, as illustrated in FIG. 8, menu items for adjusting light and shade, brightness, sharpness, color concentration, color and the like may be displayed. Or, when the acceleration sensor sensibility setting is selected among the sub menu items, as illustrated in FIG. 9, menu items for adjusting the sensibility of the acceleration sensor to sensible, normal, insensible, and a user setting may be displayed.

When the user normally performs the desired environment setup operation through the series of processes, the set values may be stored in the electronic apparatus 100 itself, transmitted from another device to the electronic apparatus 100, or loaded on the electronic apparatus by moving a storage medium.

Specifically, according to one embodiment disclosed herein, an environment setup interface, as illustrated in FIG. 6, may provide a regular power mode environment setup as a sub menu. When the regular power mode environment setup is selected, an active cutoff voltage setting menu may further be provided as a sub menu. When the active cutoff voltage setting menu is selected, as illustrated in a bottom of FIG. 6, an environment setup interface for the active cutoff voltage setting may be displayed.

Here, the environment setup interface may output adjustment buttons (+/−), which allow a user to randomly turn up or down various set values, and a bar-like indicator.

As illustrated in FIG. 6, the environment setup interface for the active cutoff voltage setting may provide a menu for setting a module to acquire time zone information, a menu for setting a time zone-based seasonal status, and a menu for setting a cutoff voltage.

Here, according to a set value of the time zone information acquisition module setting menu, the electronic apparatus 100 may be set to use one of the RTC and GPS modules.

According to a set value of the time zone-based seasonal status setting menu, the electronic apparatus 100 may generate the time zone-based season table and store the generated time zone-based season table in the storage unit 150.

According to a set value of the cutoff voltage menu, the electronic apparatus 100 may generate the season-based cutoff voltage table and store the generated season-based cutoff voltage table in the storage unit 150.

Also, the environment setup interface for the active cutoff voltage setting may include a section (division) add menu. This may allow the user to set a cutoff voltage in various manners by dividing one year on the basis of each desired section (quarter or division), resulting in improvement of user convenience.

Figure 7:
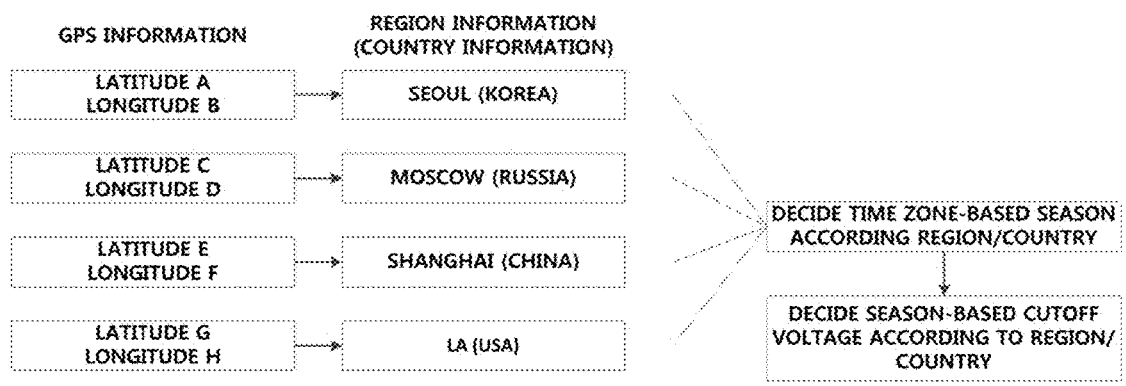
FIG. 7 is a view illustrating a region information table referred to by an electronic device in accordance with one embodiment disclosed herein.

FIG. 7 is a view illustrating region/country information referred to by an electronic device in accordance with one embodiment disclosed herein.

As illustrated in FIG. 7, the controller 170 of the electronic apparatus 100 according to the one embodiment disclosed herein may decide a time zone-based seasonal status on the basis of region information or country information.

As aforementioned, even if a current time zone is discriminated, when a region or country where the vehicle is located is different, a season is also different. Accordingly, a wrong cutoff voltage value may be likely to be applied.

Therefore, according to one embodiment of the present invention, the controller 170 may refer to various time zone-based season tables and season-based cutoff voltage tables, which are generated by considering region/country information. The various time zone-based season tables and season-based cutoff voltage tables, which have been generated by considering the region/country information, may be stored in the storage unit 150. Also, various tables which are generated according to current position information can be requested from an external server through the communication unit 110 for reception.

For example, as illustrated in FIG. 7, when a region and a country which have been discriminated by latitude A and longitude B acquired according to GPS information are Seoul and Korea, a time zone-based season table corresponding to Seoul or Korea and a season-based cutoff voltage table corresponding to Seoul or Korea may be received or loaded. Accordingly, the change or non-change of the cutoff voltage may be decided by the comparison with a current cutoff voltage.

Also, when the GPS information indicates a latitude C and a longitude D due to the changed position of the vehicle, resulting from an overseas trip or an export, a region and a country may be discriminated as Moscow and Russia. In this instance, the controller 170 may receive or load a time zone-based season table corresponding to the region and country and a season-based cutoff voltage table corresponding to the region and country. Accordingly, the change or non-change of the cutoff voltage may be decided by a re-comparison with a current cutoff voltage.

With regard to the change in the cutoff voltage, the cutoff voltage can be actively changed into an appropriate value by considering region-based position information, irrespective of region and time zone at which the vehicle is located. This may result in effectively protecting the vehicle battery 200 and preventing an erroneous operation upon moving to another region.

FIG. 8 is a view illustrating a control method for an electronic apparatus in accordance with another embodiment disclosed herein.

Hereinafter, description will be given of a control method for an electronic apparatus 100, which operates according to whether GPS is used or not when both the GPS module and the RTC module are provided.

Hereinafter, the control method for the electronic apparatus according to the one embodiment will be described with reference to FIG. 8.

First, the electronic apparatus 100 is booted and an active cutoff voltage setting is checked (S101). Detailed operations thereof will be understood by the foregoing description.

Afterwards, when the booting is done and the active cutoff voltage setting is checked, the electronic apparatus 100 determines whether or not the use of the GPS module has been set for the active voltage cutoff (S203).

The use or non-use of the GPS for the active voltage cutoff may be decided by the aforementioned environment setup interface, and also be set to a default when the electronic apparatus 100 is fabricated.

When the use of the GPS is determined, the electronic apparatus 100 acquires position information and time zone information from the GPS module (S205), and discriminates a cutoff voltage value according to a seasonal status by comparing the position information and the time zone information with tables (S207).

On the other hand, when the non-use of the GPS is determined, the electronic apparatus 100 acquires time zone information from the RTC module (S209), and discriminates a cutoff voltage value according to a seasonal status on the basis of region setting and the time zone information (S211).

The steps S205 to S211 may be carried out by the cooperation of the time information module 180 and the season discrimination module 190 under the control of the controller 170 of the electronic apparatus 100.

Through the steps S203 to S211, the active cutoff voltage value may be appropriately set according to region information and time zone information discriminated based on GPS information when the GPS is used.

In addition, even when the GPS is not used, the active cutoff voltage value may be appropriately set according to region setting which has been set in the electronic apparatus 100 itself and the time zone information. The region may be set in the storage unit 150 at the fabricating and selling stage of the electronic apparatus 100, or set according to a user's environment setup.

Specifically, in this embodiment, an appropriate cutoff voltage can be set on the basis of a region, even when the electronic apparatus 100 is not provided with the GPS module.

Afterwards, the electronic apparatus 100 decides the change or non-change of the cutoff voltage for cutting power off, according to the discrimination of the cutoff voltage value (S213).

When the cutoff voltage on the table is different from the existing cutoff voltage by a predetermined value, the controller 170 may decide the change of the cutoff voltage into the cutoff voltage on the table. On the other hand, when the cutoff voltage on the table is not different from the existing cutoff voltage by the predetermined value, the controller 170 may decide the maintenance of the existing cutoff voltage.

Afterwards, when the cutoff voltage is decided to change, the electronic apparatus 100 may apply the changed cutoff voltage (S215). When the cutoff voltage is decided not to change, the electronic apparatus 100 may maintain the existing cutoff voltage (S217).

The controller 170 may apply the changed cutoff voltage by applying hardware change or software data setting change in a manner of controlling the power supply unit 160.

When the cutoff voltage changes, the power supply unit 160 may monitor a voltage of power received from the vehicle battery 200, and then cut the power supply off when the monitored voltage is lowered below the changed cutoff voltage.

Meanwhile, the control method for the electronic apparatus according to the various embodiments disclosed herein may be implemented into program codes so as to be provided to each server or device in a state of being stored in a non-transitory computer-readable medium.

The non-transitory computer-readable medium does not refer to a medium, such as a register, a cache, a memory or the like, in which data is stored for a short term of time, but a medium in which data is semi-permanently stored and readable by a device. In detail, those aforementioned various applications or programs may be provided by being stored in a non-transitory computer-readable medium, such as CD, DVD, hard disk, Blue ray disk, USB, memory card, ROM and the like.

Also, the foregoing description has been given of the preferred embodiments. However, the present invention is not limited by those preferred embodiments, and those skilled in the art will appreciate that various modifications, additions and substitutions are possible, without departing from essential characteristics of the invention. Also, the modifications and the like should not be understood individually apart from the technical ideas or expectation of the present invention.

What is claimed is:

1. A control method for an electronic apparatus, the method comprising:
　acquiring current time zone information;
　discriminating a seasonal status in the vicinity of a vehicle on the basis of the acquired current time zone information;
　deciding a change or non-change of a minimum cutoff voltage for cutting off power received from a battery of the vehicle according to the discriminated seasonal status; and
　changing the cutoff voltage according to the change or non-change of the cutoff voltage.

2. The method of claim 1, wherein the acquiring of the current time zone information comprises:
　acquiring section information as the current time zone information, the section information being acquired based on time information obtained from a Real Time Clock (RTC) module.

3. The method of claim 2, further comprising:
　updating the time information of the RTC module according to time information updated by an environment setup of the electronic apparatus.

4. The method of claim 3, wherein the updating comprises:
　executing the environment setup of the electronic apparatus and the time zone information according to data, the data resulting from that a second electronic apparatus executes the environment setup for the electronic apparatus, and
　wherein the time information of the RTC module is synchronized with time information of the second electronic apparatus.

5. The method of claim 1, wherein the acquiring of the current time zone information comprises acquiring the current time zone information based on time information obtained from a global positioning system (GPS) module, and
　wherein the discriminating of the seasonal status comprises discriminating the seasonal status based on position information acquired from the GPS module and the current time zone information.

6. The method of claim 5, wherein the discriminating of the seasonal status comprises:
　acquiring region information where the vehicle is located based on the position information acquired from the GPS module; and
　discriminating the seasonal status according to the acquired region information and the current time zone information.

7. The method of claim 1, wherein the deciding of the change or non-change of the cutoff voltage comprises:
　acquiring region information based on an environment setup value of the electronic apparatus or position information acquired from a GPS module;
　acquiring a cutoff voltage value corresponding to the acquired region information and the seasonal status based on at least one table; and
　deciding the change or non-change of the cutoff voltage according to the acquired cutoff voltage value.

8. The method of claim 1, wherein the acquiring of the current time zone information comprises acquiring the current time zone information from a predetermined module when the electronic apparatus is provided with both of a GPS module and an RTC module, and
　wherein the acquiring of the current time zone information further comprises acquiring position information for obtaining the cutoff voltage when the GPS module is selected.

9. The method of claim 1, further comprising:
　setting a cutoff voltage value according to the seasonal status on the basis of an environment setup of a second electronic apparatus connectable to the electronic apparatus.

10. An electronic apparatus comprising:
　a time information module configured to acquire current time zone information;
　a season discrimination module configured to discriminate a seasonal status in the vicinity of the vehicle based on the acquired current time zone information;
　a controller configured to decide a change or non-change of a cutoff voltage for cutting off power received from a battery of a vehicle according to the discriminated seasonal status; and
　a power supply unit configured to change the cutoff voltage according to the change or non-change of the cutoff voltage.

11. The apparatus of claim 10, wherein the time information module acquires the current time zone information based on time information acquired from a Real Time Clock (RTC) module.

12. The apparatus of claim 11, wherein the time information module updates the time information of the RTC module according to time zone information updated by an environment setup of the electronic apparatus.

13. The apparatus of claim 12, wherein the time information module executes the environment setup of the electronic apparatus and the time zone information update according to data, the data resulting from that a second electronic apparatus executes the environment setup for the electronic apparatus, and
　wherein the time information of the RTC module is synchronized with time information of the second electronic apparatus.

14. The apparatus of claim 10, wherein the time information module acquires the current time zone information based on time information acquired from a global positioning system (GPS) module, and
　wherein the season discrimination module discriminates the seasonal status based on position information acquired from the GPS module and the current time zone information.

15. The apparatus of claim 14, wherein the season discrimination module is configured to:
　acquire region information where the vehicle is located based on the position information acquired from the GPS module; and
　discriminate the seasonal status according to the acquired region information and the current time zone information.

16. The apparatus of claim 10, wherein the controller is configured to:

acquire region information based on an environment setup value of the electronic apparatus or position information acquired from a GPS module;

acquire a cutoff voltage value corresponding to the acquired region information or the seasonal status based on at least one table; and decide the change or non-change of the cutoff voltage according to the acquired cutoff voltage value.

17. The apparatus of claim 10, wherein the time information module acquires the current time zone information from a predetermined module when the electronic apparatus is provided with both of a GPS module and an RTC module.

18. The apparatus of claim 10, wherein the controller sets a cutoff voltage value corresponding to the seasonal status, according to an environment setup of a second electronic apparatus connectable to the electronic apparatus.

19. A control method for an electronic apparatus, the method comprising:

connecting the electronic apparatus through a network;

acquiring current time zone information related to the electronic apparatus;

discriminating a seasonal status in the vicinity of a vehicle on the basis of the acquired current time zone information;

deciding a minimum cutoff voltage value for cutting off power received from a battery of the vehicle to the electronic apparatus according to the discriminated seasonal status; and transmitting the minimum cutoff voltage value to the electronic apparatus.

20. A computer-readable storage medium having a program recorded therein, the program provided to execute in the computer a method disclosed in claim 1.

* * * * *